United States Patent
Liu et al.

(10) Patent No.: US 11,604,894 B2
(45) Date of Patent: Mar. 14, 2023

(54) DATA PROCESSING METHODS, APPARATUSES, DEVICES, AND MEDIA

(71) Applicant: ALIPAY (HANGZHOU) INFORMATION TECHNOLOGY CO., LTD., Zhejiang (CN)

(72) Inventors: Qin Liu, Hangzhou (CN); Shubo Li, Hangzhou (CN); Yuan Chen, Hangzhou (CN); Renhui Yang, Hangzhou (CN); Wenyu Yang, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/362,914

(22) Filed: Jun. 29, 2021

(65) Prior Publication Data
US 2021/0326477 A1   Oct. 21, 2021

(30) Foreign Application Priority Data
Jul. 24, 2020   (CN) .......................... 202010723431.6

(51) Int. Cl.
*G06F 21/62*   (2013.01)
(52) U.S. Cl.
CPC ................ *G06F 21/6245* (2013.01)
(58) Field of Classification Search
CPC combination set(s) only.
See application file for complete search history.

(56) References Cited

U.S. PATENT DOCUMENTS

| | | | |
|---|---|---|---|
| 10,382,205 B1* | 8/2019 | Ko | H04L 9/3236 |
| 10,505,741 B1 | 12/2019 | Conley | |
| 11,386,191 B2* | 7/2022 | Yang | H04L 9/0894 |
| 11,469,886 B2* | 10/2022 | Padmanabhan | H04L 9/0894 |
| 2018/0157999 A1* | 6/2018 | Arora | G06Q 10/02 |
| 2018/0254898 A1 | 9/2018 | Sprague et al. | |
| 2019/0036710 A1* | 1/2019 | Qiu | H04L 9/3265 |

(Continued)

FOREIGN PATENT DOCUMENTS

| | | |
|---|---|---|
| CN | 1996955 | 7/2007 |
| CN | 103677935 | 3/2014 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Harris C Wang
(74) *Attorney, Agent, or Firm* — Fish & Richardson P.C.

(57) ABSTRACT

Embodiments of the present specification disclose data processing methods, apparatuses, devices, and media. One method includes the following: receiving a data use request; determining data to be used based on the data use request; determining one or more approvers of the data to be used; sending an approval instruction to the one or more approvers, wherein the approval instruction instructs the one or more approvers to approve the data use request; receiving feedback data from the one or more approvers; and determining that the data use request is approved if the feedback data satisfies a predetermined condition.

19 Claims, 3 Drawing Sheets

(56) References Cited

U.S. PATENT DOCUMENTS

| | | | |
|---|---|---|---|
| 2019/0109706 A1 | 4/2019 | Peterson et al. | |
| 2021/0326477 A1* | 10/2021 | Liu | H04L 9/3239 |
| 2021/0328780 A1* | 10/2021 | Yang | H04L 9/0894 |
| 2021/0397688 A1* | 12/2021 | Yang | G06F 21/64 |

FOREIGN PATENT DOCUMENTS

| | | |
|---|---|---|
| CN | 104010044 | 8/2014 |
| CN | 105631322 | 6/2016 |
| CN | 106408486 | 2/2017 |
| CN | 107507091 | 12/2017 |
| CN | 107579979 | 1/2018 |
| CN | 107622385 | 1/2018 |
| CN | 107729745 | 2/2018 |
| CN | 107742189 | 2/2018 |
| CN | 107968709 | 4/2018 |
| CN | 108076011 | 5/2018 |
| CN | 108471350 | 8/2018 |
| CN | 108616539 | 10/2018 |
| CN | 108632284 | 10/2018 |
| CN | 108881160 | 11/2018 |
| CN | 108932297 | 12/2018 |
| CN | 108985089 | 12/2018 |
| CN | 109150607 | 1/2019 |
| CN | 109245893 | 1/2019 |
| CN | 109376504 | 2/2019 |
| CN | 109522722 | 3/2019 |
| CN | 109525400 | 3/2019 |
| CN | 109547500 | 3/2019 |
| CN | 109660358 | 4/2019 |
| CN | 109710270 | 5/2019 |
| CN | 109741039 | 5/2019 |
| CN | 109768865 | 5/2019 |
| CN | 109840436 | 6/2019 |
| CN | 109993490 | 7/2019 |
| CN | 110009232 | 7/2019 |
| CN | 110034924 | 7/2019 |
| CN | 110046165 | 7/2019 |
| CN | 110070359 | 7/2019 |
| CN | 110083610 | 8/2019 |
| CN | 110086804 | 8/2019 |
| CN | 110222533 | 9/2019 |
| CN | 110224837 | 9/2019 |
| CN | 110335149 | 10/2019 |
| CN | 110457875 | 11/2019 |
| CN | 110516178 | 11/2019 |
| CN | 11063 6062 | 12/2019 |
| CN | 110555292 | 12/2019 |
| CN | 110837658 | 2/2020 |
| CN | 110968743 | 4/2020 |
| CN | 110990804 | 4/2020 |
| CN | 111049660 | 4/2020 |
| CN | 111090876 | 5/2020 |
| CN | 111179067 | 5/2020 |
| CN | 111191268 | 5/2020 |
| CN | 111212125 | 5/2020 |
| CN | 111222157 | 6/2020 |
| CN | 111340627 | 6/2020 |
| CN | 111414599 | 7/2020 |
| CN | 111415157 | 7/2020 |
| CN | 111506662 | 8/2020 |
| CN | 111597565 | 8/2020 |
| CN | 111741036 | 10/2020 |
| WO | WO 2019179535 | 5/2020 |

OTHER PUBLICATIONS

Nakamoto, "Bitcoin: A Peer-to-Peer Electronic Cash System," www.bitcoin.org, 2005, 9 pages.
U.S. Appl. No. 17/364,658, filed Jun. 30, 2021, Wenyu Yang.
U.S. Appl. No. 17/359,475, filed Jun. 25, 2021, Renhui Yang.
U.S. Appl. No. 17/358,249, filed Jun. 25, 2021, Shubo Li.
U.S. Appl. No. 17/359,487, filed Jun. 25, 2021, Renhui Yang.
U.S. Appl. No. 17/348,975, filed Jun. 1, 2021, Renhui Yang.
U.S. Appl. No. 17/364,602, filed Jun. 30, 2021, Renhui Yang.
U.S. Appl. No. 17/349,764, filed Jun. 16, 2021, Qin Liu.
U.S. Appl. No. 17/359,069, filed Jun. 25, 2021, Yuan Chen.
U.S. Appl. No. 17/359,219, filed Jun. 25, 2021, Yuan Chen.
U.S. Appl. No. 17/359,476, filed Jun. 25, 2021, Wenyu Yang.
Extended European Search Report in European Application No. 21181328.2, dated Dec. 17, 2021, 8 pages.

* cited by examiner

DATA PROCESSING METHODS, APPARATUSES, DEVICES, AND MEDIA

CROSS-REFERENCE TO RELATED APPLICATIONS

This application claims priority to Chinese Patent Application No. 202010723431.6, filed on Jul. 24, 2020, which is hereby incorporated by reference in its entirety.

TECHNICAL FIELD

The present application relates to the field of computer technologies, and in particular, to data processing methods, apparatuses, devices, and media.

BACKGROUND

At present, the Internet generates and stores various data, including data related to user privacy and other privacy, and how to controllably use the Internet data is an important issue.

In view of this, there is a need for effective and efficient data management and control solutions.

SUMMARY

Embodiments of the present specification provide data processing methods, apparatuses, devices, and media, which are used to solve the technical problem of how to effectively and efficiently manage and control Internet data.

In order to solve the previously described technical problem, the embodiments of the present specification adopt the following technical solutions:

The embodiments of the present specification provide a data processing method, including the following: a data use request is received, and data to be used is determined based on the data use request; one or more approvers corresponding to the data to be used are determined; an approval instruction is sent to each approver, where the approval instruction is used for instructing each approver to approve the data use request; and approval feedback data of each approver is received, and it is determined that the data use request is approved if the approval feedback data satisfies a predetermined condition.

The embodiments of the present specification provide a data processing apparatus, including the following: a data determination module, configured to receive a data use request, and determine data to be used based on the data use request; an approval determination module, configured to determine one or more approvers corresponding to the data to be used; an approval initiation module, configured to send an approval instruction to each approver, where the approval instruction is used for instructing each approver to approve the data use request; and an approval judgment module, configured to receive approval feedback data of each approver, and determine that the data use request is approved if the approval feedback data satisfies a predetermined condition.

The embodiments of the present specification provide a data processing device, including the following: at least one processor; and a memory communicably coupled to the at least one processor, where the memory stores instructions executable by the at least one processor, and the instructions are executed by the at least one processor so that the at least one processor is able to execute the previously described data processing method.

The embodiments of the present specification provide a computer readable storage medium, storing computer executable instructions that, when executed by a processor, implement the previously described data processing method.

The previously described at least one technical solution adopted in the embodiments of the present specification can achieve the following beneficial effects:

The use of data can be systematically managed and controlled because the data needs to be approved by each approver before being used, so that the effectiveness and efficiency of data management and control are improved, and the use security of the data is improved.

BRIEF DESCRIPTION OF DRAWINGS

In order to more clearly illustrate the embodiments of the present specification or the technical solutions in the existing technology, the accompanying drawings used in the description of the embodiments of the present specification or the existing technology will be briefly described below. Clearly, the drawings in the following description are only some of the embodiments described in the present specification, and for a person of ordinary skill in the art, other drawings can be obtained based on these drawings without involving any creative effort.

DESCRIPTION OF EMBODIMENTS

In order for a person skilled in the art to better understand the technical solutions in the present specification, the technical solutions in the embodiments of the present application will be clearly and comprehensively described below with reference to the accompanying drawings in the embodiments of the present application. Clearly, the described embodiments are only a part of the embodiments of the present application and not all embodiments. All other embodiments obtained by a person of ordinary skill in the art based on the embodiments of the present specification without involving creative effort should fall within the scope of protection of the present application.

At present, the Internet generates and stores various data, including data related to user privacy and other privacy, and how to controllably use the Internet data is an important issue.

Figure 1:
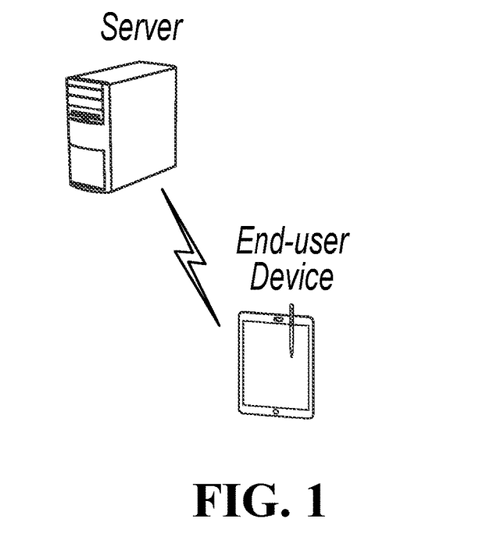
FIG. 1 is a schematic diagram illustrating an executive subject of a data processing method, according to a first embodiment of the present specification.

A first embodiment of the present specification provides a data processing method, and an executive subject of the present embodiment can be an end-user device (including but not limited to a mobile phone, a computer, a pad, and a television) or a server or a corresponding data processing platform or an operating system, etc. That is, the executive subject can be various, and the executive subject can be set, used, or transformed as needed. In addition, a third-party application can alternatively be provided to assist the executive subject in executing the present embodiment. For example, as shown in FIG. 1, the data processing method in the present embodiment can be executed by a server, and an application (corresponding to the server) can be installed on an end-user device (held by a user), the end-user device and the server, or the application and the server can perform data transmission, and data collection or input or output, or page presentation, or information presentation (to the user) can be performed through the end-user device or the application, thereby assisting the server in executing the data processing method in the present embodiment.

In particular, the executive subject of the present embodiment can be a node in a blockchain or a server serving a blockchain.

Figure 2:
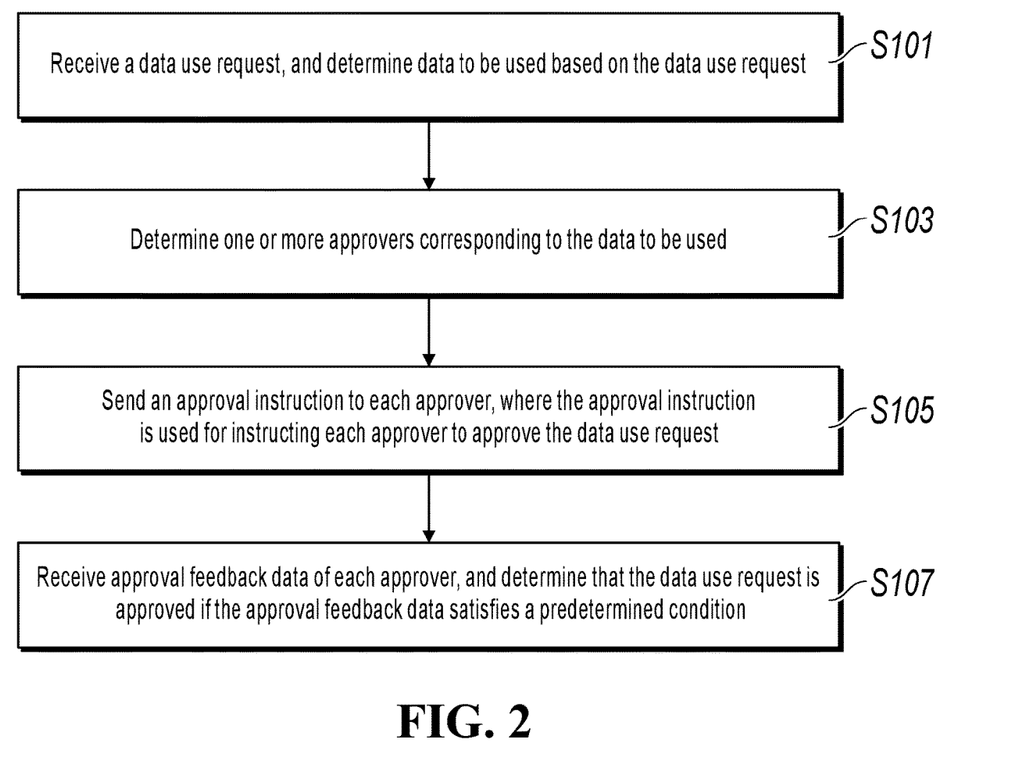
FIG. 2 is a schematic flowchart illustrating a data processing method, according to a first embodiment of the present specification.
Figure 3:
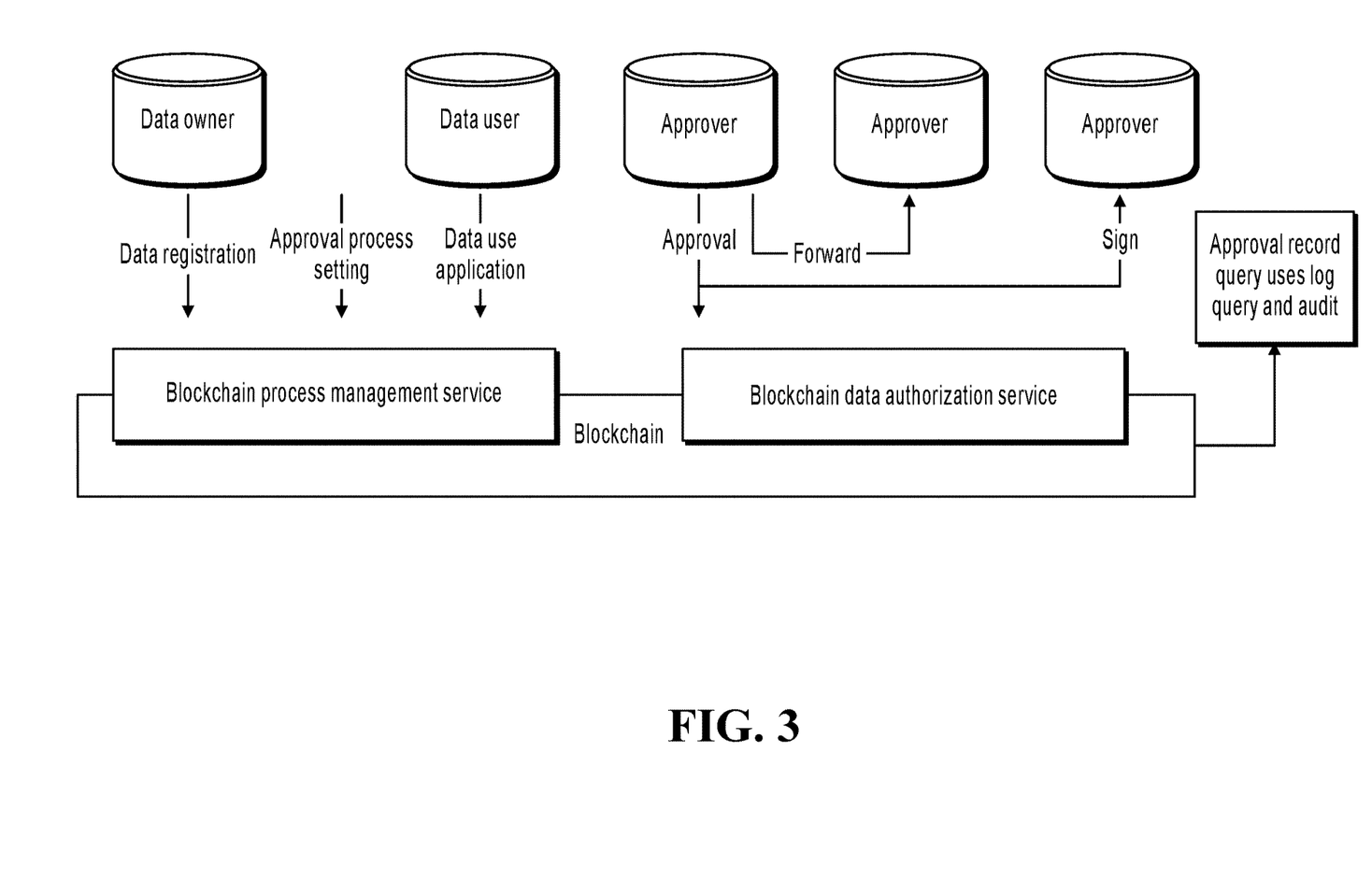
FIG. 3 is a schematic diagram illustrating a data processing process, according to a first embodiment of the present specification.

As shown in FIG. 2 and FIG. 3, the data processing method provided by the present embodiment includes the following:

S101. (An executive subject) receives a data use request, and determines data to be used based on the data use request.

In the present embodiment, the executive subject can receive a data use request (or data use application). The data use request is an instruction requesting the use of certain data. The data use request can include data information requested to be used, including, but not limited to, the type, name, capacity, etc. of data requested to be used. A sender of the data use request can be an end-user device, a server, and other subjects. The data use request can further include information of the sender (or data user) of the data use request to determine the sender from the data use request.

After a data use request is received, "data requested to be used", i.e. data to be used, corresponding to the data use request can be determined based on the data use request. As above, since the data use request can include various attributes such as the type, name, and capacity of data requested to be used, data to be used can be determined based on these attributes.

In the present embodiment, the data to be used can be data stored by the executive subject. The data to be used can be registered data on the executive subject or other subjects. In the present embodiment, data to be registered can be obtained firstly, and then the data to be registered can be registered, so that the data to be registered becomes registered data. Specifically, data registration can be performed on the executive subject or other subjects by one or more of 1.1 to 1.8 (the present embodiment is not limited to the content described in 1.1 to 1.8):

1.1. An executive subject generates data to be registered.

In the present embodiment, the executive subject can generate various data at any time. For example, the executive subject is a service server for providing certain services to users, and the executive subject can generate corresponding data when users use the services. For example, the executive subject is a social service server, and the executive subject generates corresponding data when users use social services. The executive subject is a financial service server, and the executive subject generates corresponding data when users use financial services. The data generated by the executive subject can be used as data to be registered, or data satisfying a predetermined condition in the data generated by the executive subject can be used as data to be registered, where the predetermined condition can be set based on actual needs.

The executive subject can generate identification data corresponding to the data to be registered, where the identification data is used for representing the data to be registered corresponding to the identification data. The executive subject can respectively generate corresponding identification data for different data to be registered.

For any data A to be registered, the executive subject can register data A to be registered based on identification data corresponding to data A to be registered, so that data A to be registered becomes registered data, that is, data A to be registered is used as registered data. Specifically, registering data A to be registered can include storing data A to be registered and a mapping relationship between data A to be registered and identification data corresponding to data A to be registered, similarly hereinafter.

1.2. An executive subject receives data to be registered.

In the present embodiment, data to be registered can be issued to the executive subject by other subjects (e.g., data owner), but not generated by the executive subject, and then the executive subject generates corresponding identification data for the data to be registered. The process of generating identification data and registering is the same as 1.1.

1.3. An executive subject receives data to be registered and identification data.

In the present embodiment, the executive subject can receive data to be registered and identification data corresponding to the data to be registered, thereby registering the data to be registered based on the identification data corresponding to the data to be registered, and taking the data to be registered as registered data. The registration process is the same as 1.1.

1.4. An executive subject executes at least one of receiving and/or generating data to be registered and identification data respectively.

In the present embodiment, the executive subject can execute at least one of generating or receiving data to be registered, and then send a registration request corresponding to the data to be registered to a specified blockchain node so that the specified blockchain node generates identification data corresponding to the data to be registered.

The executive subject can receive the identification data corresponding to the data to be registered sent by the specified blockchain node, register the data to be registered based on the identification data corresponding to the data to be registered, and take the data to be registered as registered data.

For example, for any data B to be registered generated or received by the executive subject, the executive subject sends a registration request corresponding to data B to be registered to a specified blockchain node so that the specified blockchain node generates identification data corresponding to data B to be registered and returns the data to the executive subject. The executive subject receives the identification data corresponding to data B to be registered sent by the specified blockchain node, and registers data B to be registered based on the identification data corresponding to data B to be registered.

1.5. An executive subject executes at least one of generating or receiving data to be registered and makes it reach a consensus.

In the present embodiment, the executive subject can execute at least one of generating or receiving data to be registered and generate identification data for the data to be registered; or receiving data to be registered and identification data corresponding to the data to be registered.

The executive subject can send the data to be registered and the identification data corresponding to the data to be registered to a specified blockchain node, so that the specified blockchain node performs a consensus on the data to be registered and the identification data corresponding to the data to be registered, and the specified blockchain node registers the data to be registered based on the identification data corresponding to the data to be registered after the consensus (for the data to be registered and the identification data corresponding to the data to be registered) is reached, and take the data to be registered as registered data.

For example, for any data C to be registered generated or received by the executive subject, the executive subject generates corresponding identification data for data C to be registered; or the executive subject receives data C to be registered and identification data corresponding to data C to be registered; the executive subject sends data C to be registered and identification data corresponding to data C to be registered to a specified blockchain node, so that the specified blockchain node performs a consensus on data C to be registered and the identification data corresponding to data C to be registered; and after the consensus for data C to be registered and the identification data corresponding to data C to be registered is reached, the specified blockchain node registers data C to be registered based on the identification data corresponding to data C to be registered. The registration process is the same as 1.1.

1.6. An executive subject executes at least one of generating or receiving data to be registered and performs a consensus.

In the present embodiment, the executive subject can execute at least one of generating or receiving data to be registered and generate identification data for the data to be registered; or, receiving data to be registered and identification data corresponding to the data to be registered.

If the executive subject is a consensus node of a blockchain, the executive subject can perform a consensus on the data to be registered generated by the executive subject and the identification data corresponding to the data to be registered (besides the executive subject, other consensus nodes in the same blockchain can alternatively perform a consensus on the data to be registered and the identification data corresponding to the data to be registered), register the data to be registered based on the identification data corresponding to the data to be registered after the consensus is reached, and take the data to be registered as registered data. The registration process is the same as 1.1.

For example, for any data D to be registered generated or received by the executive subject, the executive subject generates corresponding identification data for data D to be registered; or the executive subject receives data D to be registered and identification data corresponding to data D to be registered; the executive subject performs a consensus on data D to be registered and the identification data corresponding to data D to be registered; and after the consensus for data D to be registered and the identification data corresponding to data D to be registered is reached, data D to be registered is registered based on the identification data corresponding to data D to be registered.

1.7. An executive subject receives data to be registered that has reached consensus and identification data corresponding to the data to be registered.

In the present embodiment, the executive subject can receive data to be registered and identification data corresponding to the data to be registered that has reached consensus by consensus nodes of other blockchains, register the data to be registered based on the identification data corresponding to the data to be registered, and take the data to be registered as registered data. The registration process is the same as 1.1.

1.8. An executive subject executes at least one of generating or receiving data to be registered and performs a common consensus.

In the present embodiment, the executive subject can execute at least one of generating or receiving data to be registered, and generate identification data for the data to be registered; or, receiving data to be registered and identification data corresponding to the data to be registered.

The executive subject performs a consensus on the data to be registered and the identification data corresponding to the data to be registered, registers the data to be registered based on the identification data corresponding to the data to be registered after the consensus is reached, and takes the data to be registered as registered data; and the executive subject sends the data to be registered and the identification data corresponding to the data to be registered to a specified blockchain node so that the specified blockchain node performs a consensus on the data to be registered and the identification data corresponding to the data to be registered, and the specified blockchain node registers the data to be registered based on the identification data corresponding to the data to be registered after the consensus is reached, and takes the data to be registered as registered data.

For example, for any data E to be registered generated or received by the executive subject, the executive subject generates corresponding identification data for data E to be registered; or the executive subject receives data E to be registered and identification data corresponding to data E to be registered; the executive subject can perform a consensus (which may be referred to as a first consensus) on data E to be registered and the identification data corresponding to data E to be registered, and registers data E to be registered based on the identification data corresponding to data E to be registered after the first consensus is reached; and the executive subject sends data E to be registered and the identification data corresponding to data E to be registered to a specified blockchain node, so that the specified blockchain node performs a consensus (which may be referred to as a second consensus) on data E to be registered and the identification data corresponding to data E to be registered, and the specified blockchain node registers data E to be registered based on the identification data corresponding to data E to be registered after the second consensus is reached.

It can be seen from the above that "obtaining data to be registered" in the present embodiment can be that the executive subject executes at least one of generating data to be registered or receiving data to be registered.

In addition to the content described in 1.1 to 1.8, there can be other ways to register data.

It can be seen from the previous content that the executive subject can register data to be registered, and other subjects (e.g., specified blockchain node) can register data to be registered. Regardless of being registered by any subject, data to be registered becomes registered data. After data to be used is determined, it can then be determined whether the data to be used is registered and whether it is registered (or stored) on the executive subject or on other subjects.

Through any of the previously described consensus processes, a consensus can be performed on data to be registered and identification data corresponding to the data to be registered, and the data is registered after the consensus is reached, so that the data to be registered and the identification data corresponding to the data to be registered are prevented from being tampered by utilizing the non-tampering characteristic of a blockchain, and the security and credibility of the data are ensured.

When data registration is performed, the data to be registered can be registered based on a predetermined template. In addition, a custom template can alternatively be adopted, modified content can be added and deleted from the custom template as needed, and the custom template is used for data registration. For example, the content of the predetermined template or the custom template includes, but is not limited to, approver information and approval authority information corresponding to each approver, or the content of the predetermined template or the custom template includes, but is not limited to, approval rules corresponding to data registration, and the approval rules can include approver information and approval authority information corresponding to each approver. Setting an approval rule for data is equivalent to setting an approval process after the data is applied for use, that is, setting an approver and an approval authority.

In the present embodiment, the approver can be at least one of an owner of the data to be used or a storage party of the data to be used. "Owner of data to be used" and "storage party of data to be used" described here can be the same or different. For example, if the data to be used is service data of a certain service, the owner and the storage party of the data to be used can be service providers of the service (the service providers can be servers or other products). For another example, company X uses an own server to provide a certain service and maintain the service, service data of the service is stored on the server of company X, and company X (or the server of company X) is the owner and the storage party of the service data of the service. For another example, company X rents a server of company Y to provide a certain service and maintain the service, the owner of the service data of the service can be company X since company X is a nominal provider of the service, and the storage party of the service data of the service is the server of company Y.

In addition, the owner of the data to be used can alternatively be a user (or a user account). For example, the owner of some data relating to user privacy can be a user.

In addition, the approver can further include a primary approver or a secondary approver, and each approver has a corresponding approval authority. The primary approver can have a primary approval authority, and the secondary approver can have a secondary approval authority. For example, the primary approval authority can be a priority approval authority, and the secondary approval authority can be a signed approval (on the basis of a primary approval).

For example, for any data C to be registered, the content of the predetermined or custom template includes, but is not limited to, approvers corresponding to the registration of data C and an approval authority of each approver, as shown in Table 1 (Table 1 is for illustration only):

TABLE 1

| Data name | Approver | Approval character | Approval authority |
|---|---|---|---|
| Data C | Approver 1<br>Approver 2 | Primary approver<br>Secondary approver | Primary approval<br>Signed approval |

In the present embodiment, some subjects can be registered on the executive subject or other subjects. Specifically, subject registration can be performed on the executive subject or other subjects by one or more of 2.1 to 2.7 (the present embodiment is not limited to the content described in 2.1 to 2.7):

2.1. An executive subject receives a registration request.

In the present embodiment, the executive subject can receive a registration request, the registration request can be sent by a registration requester or other subjects (for example, the registration request sends a registration request to the other subjects, the other subjects send the registration request to the executive subject, similarly hereinafter), and the executive subject can determine a registration requester corresponding to the registration request. The registration requester can be a server or an end-user device, etc., and the registration request can contain attribute data of the registration requester, including but not limited to the name, type, etc. of the registration requester.

The executive subject can generate identity data corresponding to the registration requester, where the identity data is used for representing the registration requester corresponding to the identity data. The executive subject can respectively generate corresponding identity data for different registration requesters.

For any registration requester a, the executive subject can register registration requester a based on identity data corresponding to registration requester a, and take registration requester a as a registered party after the registration is successful. Specifically, registering registration requester a can include storing registration requester a and a mapping relationship between registration requester a and identification data corresponding to registration requester a, similarly hereinafter.

2.2. An executive subject receives identity data.

In the present embodiment, the executive subject can receive identity data corresponding to a registration requester, and determine a corresponding registration requester based on the identity data. The executive subject registers the corresponding registration requester based on the identity data, and takes the registration requester as a registered party, referring to 2.1.

2.3. An executive subject respectively receives a registration request and identity data.

In the present embodiment, the executive subject can receive a registration request, can determine a registration requester corresponding to the registration request, can send the registration request to a specified blockchain node so that the specified blockchain node determines the registration requester corresponding to the registration request, and can generate identity data corresponding to the registration requester.

The executive subject can receive the identity data corresponding to the registration requester sent by the specified blockchain node, register the registration requester based on the identity data corresponding to the registration requester, and take the registration requester as a registered party.

For example, the executive subject receives a registration request, determines registration requester b corresponding to the registration request, sends the corresponding registration request to a specified blockchain node so that the specified blockchain node determines registration requester b corresponding to the registration request, and generates identity data corresponding to registration requester b. The executive subject can receive the identity data corresponding to registration requester b sent by the specified blockchain node, and register registration requester b based on the identity data corresponding to registration requester b, so that registration requester b becomes a registered party.

2.4. An executive subject receives at least one of a registration request or identity data and makes them reach a consensus.

In the present embodiment, the executive subject can execute at least one of receiving a registration request, determining a registration requester corresponding to the registration request, and generating corresponding identity data for the registration requester; or, receiving identity data corresponding to a registration requester, and determining a corresponding registration requester based on the identity data.

The executive subject can send the identity data to a specified blockchain node, so that the specified blockchain node performs a consensus on the identity data and the specified blockchain node registers the registration requester based on the identity data corresponding to the registration requester after the consensus is reached, and take the registration requester as a registered party.

For example, the executive subject receives a registration request, determines registration requester c corresponding to the registration request, and generates corresponding identity data for registration requester c; or, the executive subject receives identity data corresponding to registration requester c; the executive subject sends the identity data to a specified blockchain node, so that the specified blockchain node determines registration requester c based on the identity data, and performs a consensus on the identity data; and the specified blockchain node registers registration requester c based on the identity data corresponding to registration requester c after the consensus for the identity data is reached, so that registration requester c becomes a registered party.

2.5. An executive subject receives at least one of a registration request or identity data and performs a consensus.

In the present embodiment, the executive subject can execute at least one of receiving a registration request, determining a registration requester corresponding to the registration request, and generating corresponding identity data for the registration requester; or, receiving identity data corresponding to a registration requester, and determining a corresponding registration requester based on the identity data.

If the executive subject is a consensus node of a blockchain, the executive subject can perform a consensus on the identity data (besides the executive subject, other consensus nodes in the same blockchain can alternatively perform a consensus on the identity data), register the registration requester based on the identity data corresponding to the registration requester after the consensus is reached, and take the registration requester as a registered party.

For example, the executive subject receives a registration request, determines registration requester d corresponding to the registration request, and generates corresponding identity data for registration requester d; or, the executive subject receives identity data corresponding to registration requester d; the executive subject performs a consensus on the identity data corresponding to registration requester d; and registration requester d is registered based on the identity data corresponding to registration requester d after the consensus for the identity data is reached, so that registration requester d becomes a registered party.

2.6. An executive subject receives identity data that has reached consensus.

In the present embodiment, the executive subject can receive identity data corresponding to a registration requester that has reached consensus by consensus nodes of other blockchains, determine a corresponding registration requester based on the identity data, register the registration requester corresponding to the identity data based on the identity data, and take the registration requester as a registered party.

2.7. An executive subject receives at least one of a registration request or identity data and performs a common consensus.

In the present embodiment, the executive subject can execute at least one of receiving a registration request, determining a registration requester corresponding to the registration request, and generating corresponding identity data for the registration requester; or, receiving identity data corresponding to a registration requester, and determining a corresponding registration requester based on the identity data.

The executive subject can perform a consensus on the identity data, register the registration requester based on the identity data corresponding to the registration requester after the consensus is reached, and take the registration requester as a registered party; and the executive subject can send the identity data to a specified blockchain node so that the specified blockchain node performs a consensus on the identity data and the specified blockchain node registers the registration requester based on the identity data corresponding to the registration requester after the consensus is reached, and take the registration requester as a registered party.

For example, the executive subject receives a registration request, determine registration requester e corresponding to the registration request, and generate corresponding identity data for registration requester e; or the executive subject receives identity data corresponding to registration requester e; the executive subject can perform a consensus (which may be referred to as a third consensus) on the identity data, and register registration requester e based on the identity data corresponding to registration requester e after the third consensus is reached so that registration requester e becomes a registered party; the executive subject sends the identity data to a specified blockchain node so that the specified blockchain node determines registration requester e based on the identity data, and performs a consensus (which may be referred to as a fourth consensus) on the identity data; and the specified blockchain node registers registration requester e based on the identity data corresponding to registration requester e after the fourth consensus is reached, so that registration requester e becomes a registered party.

In addition to the content described in 2.1 to 2.7, there can be other ways to register a registration requester.

It can be seen from the previous content that the executive subject can register a registration requester, and other subjects (e.g., specified blockchain node) can register a registration requester. Regardless of being registered by any subject, a registration requester becomes a registered party. After a data use request is received, it can then be determined whether a sender of the data use request is registered and whether it is registered (or stored) on the executive subject or on other subjects.

Through any of the previously described consensus processes, a consensus can be performed on the identity data, and a registration requester is registered after the consensus is reached, so that the identity data is prevented from being tampered by utilizing the non-tampering characteristic of a blockchain, and the security and credibility of the data are ensured.

When a registration requester is registered, the registration requester can be registered based on a predetermined template or a custom template.

The registration requester includes at least one of an owner of the data to be used, a storage party of the data to be used, or the approver.

In the present embodiment, each time a data use request is received, a processor identifier can be generated for the data use request; and/or, each time a data use request is received, a process registration instruction can be sent to a specified blockchain node so that the specified blockchain node generates a process identifier for the data use request; and the specified blockchain node sends the process identifier to the executive subject, and the executive subject receives the process identifier.

Through the consensus for a process identifier, the generated process identifier can be prevented from being tampered by utilizing the non-tampering characteristic of a blockchain, and the security and credibility of the process identifier are ensured.

As described above, the executive subject of the present embodiment can be a node in a blockchain or a server serving the blockchain, the specified blockchain node and the executive subject can belong to the same blockchain, and the specified blockchain node can be all or part of nodes in the blockchain, for example, can be all or part of consensus nodes in the blockchain. In the present embodiment, existing consensus algorithms can be used for consensus.

S103. (The executive subject) determines one or more approvers corresponding to the data to be used.

After data to be used is determined, one or more approvers corresponding to the data to be used can be determined; or, an approval rule corresponding to the data to be used can be determined, where the approval rule can include one or more approvers (needs to approve the data use request), i.e., approvers corresponding to the data to be used. For example, when any data is registered, an approver corresponding to the data has been set, and if the data belongs to the data to be used, the approver corresponding to the data belongs to the approver corresponding to the data to be used.

In particular, the approver can include a user corresponding to the data to be used. For example, the data to be used includes transaction data, where the transaction data is generated by user F using a financial transaction, and then user F is a user corresponding to the data to be used.

In the present embodiment, in addition to determining the approver corresponding to the data to be used, an approval authority or an approval process of each approver corresponding to the data to be used can further be determined; or, in addition to the approvers, the approval rule can include an approval authority of each approver or an approval process of each approver, etc. The approval authority of each approver can be determined when data registration is performed, for example, as shown in Table 1, the approver and the approval authority corresponding to the registered data are set; or after each approver corresponding to the data to be used is determined, the approval authority of each approver is determined. For example, the approval authority of the approver is determined based on the authority of each approver corresponding to the data to be used, and a relationship with the data to be used.

The approval process can include an approval priority or an approval order of each approver, for example, if the approver corresponding to the data to be used includes a primary approver and a secondary approver, the approval can be performed by the primary approver first, and then the approval can be performed by the secondary approver on the basis of the approval of the primary approver. In addition, the approval results of each approver can be forwarded to each other.

In particular, the executive subject of the present embodiment can alternatively be one of the approvers corresponding to the data to be used.

S105. The (executive subject) sends an approval instruction to each approver, where the approval instruction is used for instructing each approver to approve the data use request.

After one or more approvers (corresponding to the data to be used) are determined, the executive subject can send an approval instruction to each determined approver, where the approval instruction is used for instructing each approver to approve the data use request (for example, the approval instruction can include a statement such as "Please approve a data use request of XX data"). Therefore, each approver approves the data use request based on the respective approval authorities.

In the present embodiment, because each data use request corresponds to a process identifier, which is equivalent to that each data use request corresponds to a data use approval process, the previously described approval instruction can further enable each approver to approve the process identifier, so that each approver can accurately distinguish different data use approval processes.

It is worthwhile to note that an actual approver may be a corporate group or a natural person, etc., but a recipient of an approval instruction can be an electronic device or a network account mastered or owned by the approver, such as a computer, a mobile phone, a server, or a network account logged on the server. In the present embodiment, sending an approval instruction to an electronic device or a network account mastered or owned by an approver is considered to be sending an approval instruction to the approver.

After the electronic device or the network account mastered or owned by the approver receives the approval instruction, approval information or pages corresponding to the approval instruction can be presented for approval of the approver.

If the executive subject is one of the approvers, the executive subject can generate and present approval information or pages corresponding to the approval instruction (the executive subject is considered to send the approval instruction to the executive subject), so that the owner of the executive subject performs approval.

S107. (The executive subject) receives approval feedback data of each approver, and determines that the data use request is approved if the approval feedback data satisfies a predetermined condition.

In the present embodiment, after an approver approves an approval instruction using an electronic device or a network account mastered or owned by the approver, the approver can send approval feedback data (i.e. an approval result) to the executive subject via the electronic device or the network account. Receiving approval feedback data sent by an electronic device or a network account mastered or owned by an approver is regarded as receiving approval feedback data of the approver.

The executive subject receives approval feedback data of each approver, and determines that the data use request is approved if the approval feedback data satisfies a predetermined condition.

In the present embodiment, it is possible to determine whether the approval feedback data satisfies a predetermined condition and whether the data use request is approved based on one or more of 3.1 to 3.7 (the present embodiment is not limited to the content described in 3.1 to 3.7)

3.1. The executive subject can determine whether the approval feedback data of each approver indicates the approval or not, similarly hereinafter. If the executive subject determines that all approvers give the approval based on the approval feedback data, the approval feedback data satisfies the predetermined condition, and it can be determined that the data use request is approved.

3.2. If the executive subject determines that at least one approver does not give the approval based on the approval feedback data, the approval feedback data does not satisfy the predetermined condition, and it can be determined that the data use request is not approved.

3.3. If the executive subject determines that the number of approvers reaches a predetermined threshold based on the approval feedback data, the approval feedback data satisfies the predetermined condition, and it can be determined that the data use request is approved.

3.4. If the executive subject determines that the number of approvers does not reach a predetermined threshold based on the approval feedback data, the approval feedback data does not satisfy the predetermined condition, and it can be determined that the data use request is not approved.

3.5. If one or more approvers corresponding to the data to be used include a primary approver and the executive subject determines that a ratio of the number of primary approvers that provide approval to the number of approvers corresponding to the data to be used satisfies a predetermined ratio condition based on the approval feedback data (for example, the predetermined ratio condition is that the ratio is greater than a half), the approval feedback data satisfies the predetermined condition, and it can be determined that the data use request is approved.

3.6. If one or more approvers corresponding to the data to be used include a primary approver and the executive subject determines that a ratio of the number of primary approvers that provide approval to the number of approvers corresponding to the data to be used does not satisfy a predetermined ratio condition based on the approval feedback data (for example, the predetermined ratio condition is that the ratio is greater than a half), the approval feedback data does not satisfy the predetermined condition, and it can be determined that the data use request is not approved.

3.7. If one or more approvers corresponding to the data to be used include a primary approver and the executive subject determines that at least one approver does not give approval, the data use request is not approved.

It can be seen that the predetermined condition can be a number condition or a ratio condition, so that it can be determined whether the approval feedback data satisfies the predetermined condition based on the number or ratio of approvers which give the approval or not.

If it is determined that the data use request is approved, the data to be used can be sent to a sender of the data use request. If the data to be used is stored or registered on the executive subject, the executive subject sends the data to be used to the sender of the data use request. If the data to be used is not stored or registered on the executive subject, the executive subject can send an instruction to a subject storing the data to be used or a subject registering the data to be used, so that the subject storing the data to be used or the subject registering the data to be used sends the data to be used to the sender of the data use request. Or, if the data to be used is not stored or registered on the executive subject, the executive subject can send an instruction to a subject storing the data to be used or a subject registering the data to be used, so that the subject storing the data to be used or the subject registering the data to be used sends the data to be used to the executive subject, and the executive subject sends the data to be used to the sender of the data use request.

In addition, approval records of the data use request and data use records (which can be in the form of logs) can be queried and audited to facilitate systematic management of data use.

In the present embodiment, after the data to be used is determined, the executive subject can determine whether the data to be used is registered data. If yes, processes S103 to S107 are executed. If no, S103 is not executed, thus, \ S105 and subsequent processes are omitted. And/or, in the present embodiment, after the data use request is received, the executive subject can determine whether the sender of the data use request is a registered party. If yes, data to be used is determined, and processes S103 to S107 are executed. If no, the data to be used is not determined, and S103 and subsequent processes are omitted.

In the present embodiment, the use of data can be systematically managed and controlled because the data needs to be approved by each approver before being used, so that the effectiveness and efficiency of data management and control are improved, and the use security of the data is improved. Since the data is registered through the identification data, registered data can be accurately positioned and distinguished, and if the data to be used is the registered data, the data to be used can be accurately positioned. If the registration requester is registered through the identity data, a registrant can be accurately positioned and distinguished, and if the sender of the data use request is the registrant, the registrant can be accurately positioned. On this basis, only the registrant can be allowed to send the data use request, so that a user who requests the data can be screened, and the management of data use is facilitated. Each data use request and corresponding approval and other processes can be accurately distinguished through the process identifier, mutual interference between the data use requests is alleviated, and the processing efficiency of data use is improved.

In the present embodiment, data registration, registration requester registration, process registration, etc. can be established (or registered) on a blockchain, and the blockchain performs a consensus. The approver can further include a blockchain node, and the blockchain performs a consensus on data (including approval feedback data) in the whole approval process, i.e. the present embodiment can be implemented by a node in the blockchain or a blockchain service provider, and the blockchain provides a trusted environment and performs a consensus for the present embodiment (including various registration processes, data in the registration processes, such as identification data, identity data, and process identifiers), approval processes, and data in the approval processes (such as approval feedback data) in the present embodiment). Therefore, the blockchain provides services such as process management service and data authorization use in the present embodiment, various data involved in the present embodiment can be prevented from being tampered, and the security and credibility of the present embodiment can be improved.

In the present embodiment, since the data to be used may be generated by a user as a result of performing an on-line operation (e.g., using an on-line service), the data to be used may include data more closely related to the user, such as privacy data including user identity information. In the present embodiment, the user can be used as an approver of certain data, so that the user can alternatively approve certain data to be used (e.g., an instruction or a message about approval can be sent to an account of the user or an account login end-user device so as to facilitate approval of the user), the rights to know and ownership of personal data by the user are guaranteed, and the data security of the user is favorably maintained.

Figure 4:
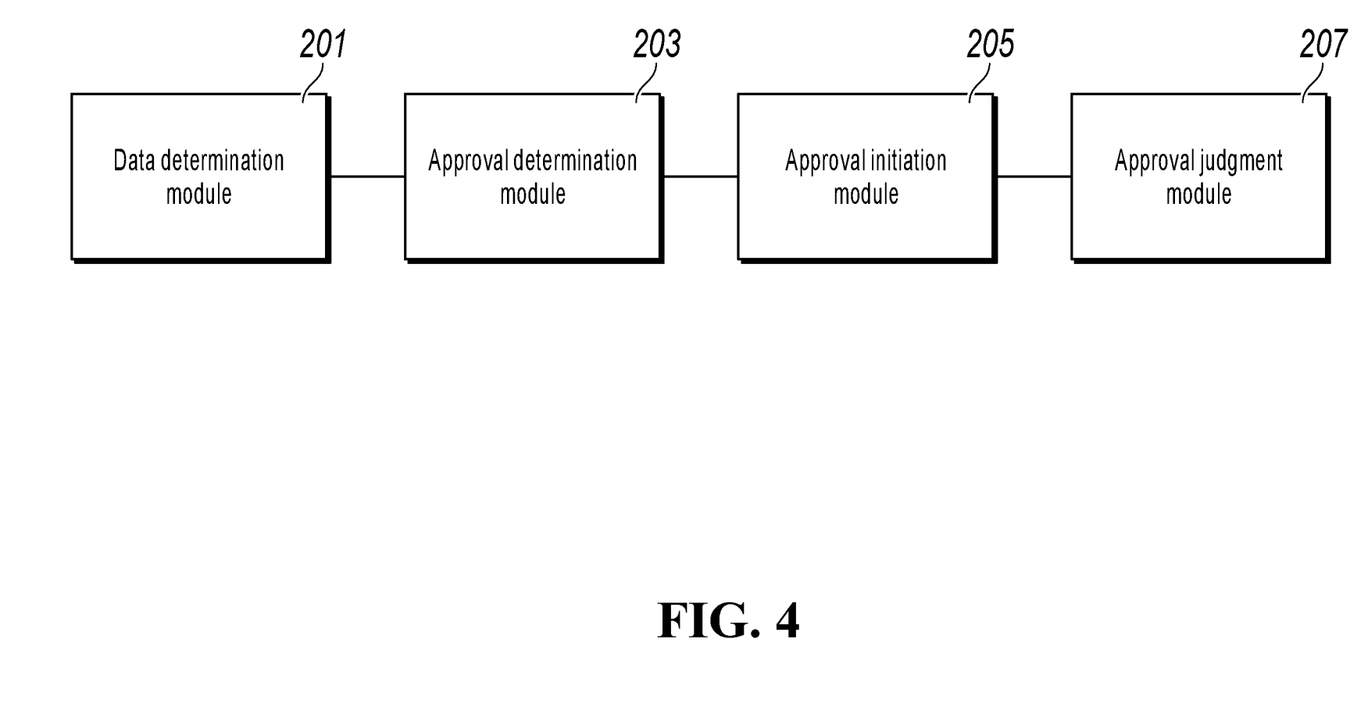
FIG. 4 is a schematic structural diagram illustrating a data processing apparatus, according to a fourth embodiment of the present specification.

As shown in FIG. 4, a second embodiment of the present specification provides a data processing apparatus, including the following:

a data determination module 201, configured to receive a data use request, and determine data to be used based on the data use request;

an approval determination module 203, configured to determine one or more approvers corresponding to the data to be used;

an approval initiation module 205, configured to send an approval instruction to each approver, where the approval instruction is used for instructing each approver to approve the data use request; and an approval judgment module 207, configured to receive approval feedback data of each approver, and determine that the data use request is approved if the approval feedback data satisfies a predetermined condition.

Optionally, the apparatus further includes the following:

a registration module, configured to: obtain data to be registered, and generate corresponding identification data for the data to be registered; and register the data to be registered based on the identification data, and take the data to be registered as registered data;

or, receive data to be registered and identification data corresponding to the data to be registered; and register the data to be registered based on the identification data, and take the data to be registered as registered data.

Optionally, the apparatus further includes the following:

a registration module, configured to: obtain data to be registered, and send a registration request corresponding to the data to be registered to a specified blockchain node, so that the specified blockchain node generates identification data corresponding to the data to be registered; and receive the identification data corresponding to the data to be registered sent by the specified blockchain node, register the data to be registered based on the identification data, and take the data to be registered as registered data;

or, perform at least one of obtaining data to be registered and generating corresponding identification data for the data to be registered, and/or, receiving data to be registered and identification data corresponding to the data to be registered;

send the data to be registered and the identification data corresponding to the data to be registered to a specified blockchain node, so that the specified blockchain node performs a consensus on the data to be registered and the identification data corresponding to the data to be registered, and the specified blockchain node registers the data to be registered based on the identification data corresponding to the data to be registered after the consensus is reached, and take the data to be registered as registered data;

or, execute at least one of obtaining data to be registered and generating corresponding identification data for the data to be registered, or, receiving data to be registered and identification data corresponding to the data to be registered;

perform a consensus on the data to be registered and the identification data corresponding to the data to be registered, register the data to be registered based on the identification data corresponding to the data to be registered after the consensus is reached, and take the data to be registered as registered data;

or, receive data to be registered that has reached consensus and identification data corresponding to the data to be registered, register the data to be registered based on the identification data corresponding to the data to be registered, and take the data to be registered as registered data.

Optionally, the apparatus further includes the following:

a registration module, configured to: execute at least one of obtaining data to be registered and generating corresponding identification data for the data to be registered, and/or, receiving data to be registered and identification data corresponding to the data to be registered;

perform a consensus on the data to be registered and the identification data corresponding to the data to be registered, register the data to be registered based on the identification data corresponding to the data to be registered after the consensus is reached, and take the data to be registered as registered data; and send the data to be registered and the identification data corresponding to the data to be registered to a specified blockchain node so that the specified blockchain node performs a consensus on the data to be registered and the identification data corresponding to the data to be registered, and the specified blockchain node registers the data to be registered based on the identification data corresponding to the data to be registered after the consensus is reached, and take the data to be registered as registered data.

Optionally, the apparatus further includes the following:

a registration module, configured to register the data to be registered based on a predetermined template or a custom template.

Optionally, the predetermined template or the custom template includes approver information.

Optionally, the predetermined template or the custom template includes approval authority information.

Optionally, the apparatus further includes the following:

a registration module, configured to: receive a registration request, determine a registration requester corresponding to the registration request, and generate corresponding identity data for the registration requester; and register the registration requester based on the identity data, and take the registration requester as a registered party;

or, receive identity data corresponding to a registration requester; and register the registration requester based on the identity data, and take the registration requester as a registered party.

Optionally, the apparatus further includes the following:

a registration module, configured to: receive a registration request, determine a registration requester corresponding to the registration request, send the registration request to a specified blockchain node so that the specified blockchain node determines the registration requester corresponding to the registration request, and generate identity data corresponding to the registration requester; and receive the identity data sent by the specified blockchain node, register the registration requester based on the identity data, and take the registration requester as a registered party;

or, receive a registration request, determine a registration requester corresponding to the registration request, and generate corresponding identity data for the registration requester, or receive identity data corresponding to a registration requester;

send the identity data to a specified blockchain node so that the specified blockchain node performs a consensus on the identity data, and the specified blockchain node registers the registration requester based on the identity data corresponding to the registration requester after the consensus is reached, and take the registration requester as a registered party;

or, receive a registration request, determine a registration requester corresponding to the registration request, and generate corresponding identity data for the registration requester, or receive identity data corresponding to a registration requester;

perform a consensus on the identity data, register the registration requester based on the identity data corresponding to the registration requester after the consensus is reached, and take the registration requester as a registered party;

or, receive identity data corresponding to a registration requester that has reached consensus, register the registration requester corresponding to the identity data based on the identity data, and take the registration requester as a registered party.

Optionally, the apparatus further includes the following:

a registration module, configured to: receive a registration request, determine a registration requester corresponding to the registration request, and generate corresponding identity data for the registration requester, or receive identity data corresponding to a registration requester;

perform a consensus on the identity data, register the registration requester based on the identity data corresponding to the registration requester after the consensus is reached, and take the registration requester as a registered party; and send the identity data to a specified blockchain node so that the specified blockchain node performs a consensus on the identity data, and the specified blockchain node registers the registration requester based on the identity data corresponding to the registration requester after the consensus is reached, and take the registration requester as a registered party.

Optionally, the apparatus further includes the following:

a registration module, configured to register the registration requester based on a predetermined template or a custom template.

Optionally, the registration requester includes at least one of an owner of the data to be used, a storage party of the data to be used, or the approver.

Optionally, the apparatus further includes the following:

a registration module, configured to: generate a process identifier for the data use request;

or, send a process registration instruction to a specified blockchain node so that the specified blockchain node generates a process identifier for the data use request, and receive the process identifier returned by the specified blockchain node.

Optionally, the approval instruction further enables each approver to approve the process identifier.

Optionally, the apparatus further includes the following:

a registration module, configured to: determine whether a sender of the data use request is a registered party; and if yes, determine data to be used based on the data use request;

or, after the determining data to be used, the method further includes the following:

it is determined whether the data to be used is registered data, and if yes, one or more approvers corresponding to the data to be used are determined.

Optionally, the approver includes a primary approver or a secondary approver, each approver has a corresponding approval authority.

Optionally, the operation of determining that the data use request is approved if the approval feedback data satisfies a predetermined condition includes the following:

if one or more approvers corresponding to the data to be used include a primary approver, and a ratio of the number of primary approvers that provide approval to the number of approvers corresponding to the data to be used satisfies a predetermined ratio condition, then the approval feedback data satisfies a predetermined condition, and it is determined that the data use request is approved.

Optionally, after one or more approvers corresponding to the data to be used are determined, the method further includes the following:

an approval authority of each approver is determined.

Optionally, the approver is at least one of an owner of the data to be used or a storage party of the data to be used.

Optionally, the apparatus further includes the following:

a sending module, configured to: send the data to be used to a sender of the data use request if it is determined that the data use request is approved.

A third embodiment of the present specification provides a data processing device, including the following:

at least one processor;

and a memory communicably coupled to the at least one processor, where the memory stores instructions executable by the at least one processor, and the instructions are executed by the at least one processor so that the at least one processor is able to execute the data processing method described in the first embodiment.

A fourth embodiment of the present specification provides a computer readable storage medium, storing computer executable instructions that, when executed by a processor, implement the data processing method described in the first embodiment.

The previously described embodiments can be used in combination, and modules having the same name can be the same or different between different embodiments.

The specific embodiments of the present specification have been described previously, and other embodiments fall within the scope of the appended claims. In some cases, the actions or steps described in the claims can be performed in a different order than in one or more embodiments, and can still achieve desired results. In addition, the processes described in the drawings do not necessarily require a specific order or sequential order shown in order to achieve the desired results. In some implementations, multitasking and parallel processing are also possible or may be advantageous.

The various embodiments in the present specification are described progressively. The same or similar parts between the various embodiments can be referred to each other. The various embodiments place emphasis on differences from other embodiments. In particular, the apparatus, device, and non-volatile computer readable storage medium embodiments are simply described since they substantially correspond to the method embodiments, and reference can be made in part to the description of the method embodiments.

The apparatus, the device, and the non-volatile computer readable storage medium provided by the embodiments of the present specification correspond to the method. Therefore, the apparatus, the device, and the non-volatile computer storage medium also have similar advantageous technical effects to the corresponding method. Since the advantageous technical effects of the method have been described in detail previously, descriptions for the advantageous technical effects of the corresponding system, apparatus, device, and non-volatile computer storage medium are omitted here for simplicity.

In the 1990s, improvements to a technology could clearly distinguish between improvements in hardware (e.g., improvements to circuit structures such as diodes, transistors, and switches) and improvements in software (improvements to method flows). However, with the development of technologies, many current improvements in method flows have been regarded as direct improvements in hardware circuit structure. Designers almost always obtain corresponding hardware circuit structures by programming the improved method flows into hardware circuits. Therefore, it is incorrect to say that an improvement of a method flow cannot be implemented with hardware entity modules. For example, a programmable logic device (PLD), such as a field programmable gate array (FPGA), is an integrated circuit with logic functions determined by a user programming the device. It is programmed by a designer to "integrate" a digital system onto a PLD without requiring a chip manufacturer to design and manufacture application specific integrated circuit (ASIC) chips. Moreover, nowadays, instead of manually manufacturing integrated circuit chips, such programming is mostly implemented by using "logic compiler" software, which is similar to a software compiler used at the time of program development and writing, and original code to be compiled must also be written in a specific programming language, which is referred to as a hardware description language (HDL). There are many HDLs rather than one HDL, such as an advanced boolean expression language (ABEL), an Altera hardware description language (AHDL), Confluence, a Cornell university programming language (CUPL), HDCal, a Java hardware description language (JHDL), Lava, Lola, MyHDL, PALASM, and a Ruby hardware description language (RHDL). A very-high-speed integrated circuit hardware description language (VHDL) and Verilog are most commonly used at present. It is also clear to a person skilled in the art that a hardware circuit implementing the logic method flow can be readily obtained by only slightly logically programming and programming the method flow into an integrated circuit by using the previous several hardware description languages.

A controller can be implemented in any suitable manner. For example, the controller can take the form of, for example, a micro processor or processor and a computer readable medium storing computer readable program code (e.g., software or firmware) executable by the (micro) processor, logic gates, switches, ASICs, programmable logic controllers, and embedded micro controllers. Examples of the controller include, but are not limited to, the following micro controllers: ARC 625D, Atmel AT91SAM, Microchip PIC18F26K20, and Silicone Labs C8051F320. The memory controller can also be implemented as a part of the control logic of the memory. A person skilled in the art also understands that, in addition to implementing the controller in pure computer readable program code, it is entirely possible to logically program the method steps such that the controller implements the same function in the form of logic gates, switches, ASICs, programmable logic controllers, embedded micro controllers, etc. Such a controller can thus be regarded as a hardware component, and an apparatus that is included in the hardware component and configured to implement various functions can also be regarded as a structure within the hardware component. Or even, the apparatus for implementing various functions can be regarded as a software module implementing the method and a structure within the hardware component.

The system, apparatus, module, or unit illustrated in the previous embodiments can be specifically implemented by using a computer chip or an entity, or can be implemented by using a product having a certain function. A typical implementation device is a computer. Specifically, the computer can be, for example, a personal computer, a laptop computer, a cellular phone, a camera phone, a smart phone, a personal digital assistant, a media player, a navigation device, an email receiving and transmitting device, a game console, a tablet computer, a wearable device, or any combination of these devices.

For convenience of description, the previous apparatuses are described as being functionally divided into various units respectively. Of course, the functions of the various units can be implemented in the same or at least one of a plurality of pieces of software or hardware when implementing the present specification.

A person skilled in the art should understand that the embodiments of the present specification can be provided as methods, systems, or computer program products. Therefore, the embodiments of the present specification can adopt forms of complete hardware embodiments, complete software embodiments or embodiments integrating software and hardware. Moreover, the embodiments of the present specification can adopt the form of a computer program product implemented on one or more computer available storage media (including, but not limited to, a disk memory, a compact disc read-only memory (CD-ROM), an optical memory, etc.) containing computer available program code.

The present specification is described with reference to at least one of flowcharts or block diagrams of the method, the device (system), and the computer program product according to the embodiments of the present specification. It should be understood that at least one of each flow or block in at least one of flowcharts or block diagrams and combinations of at least one of flows or blocks in at least one of the flowcharts or block diagrams can be implemented by computer program instructions. These computer program instructions can be provided to a general-purpose computer, a special-purpose computer, an embedded processor, or a processor of another programmable data processing device to generate a machine, such that instructions executed by the computer or the processor of the another programmable data processing device produce an apparatus for implementing functions specified in one or more flows in at least one of the flowcharts or one or more blocks in the block diagrams.

These computer program instructions can also be stored in a computer readable memory capable of guiding a computer or another programmable data processing device to work in a specific way, such that instructions stored in the computer readable memory produce a product including an instruction apparatus that implements functions specified in one or more flows in at least one of the flowcharts or one or more blocks in the block diagrams.

These computer program instructions can also be loaded to a computer or another programmable data processing device, such that a series of operating steps are performed on the computer or the another programmable data processing device to produce a computer-implemented process, and therefore instructions executed on the computer or the another programmable data processing device provide steps for implementing functions specified in one or more flows in at least one of the flowcharts or one or more blocks in the block diagrams.

In a typical configuration, the computer includes one or more central processing units (CPUs), one or more input/output interfaces, one or more network interfaces, and one or more memories.

The memory may include at least one of a non-persistent memory, a random access memory (RAM), or anon-volatile memory in a computer readable medium, such as a ROM or a flash RAM. The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a ROM, an electrically erasable programmable ROM (EEPROM), a flash memory or another memory technology, a CD-ROM, a digital versatile disc (DVD), or another optical storage, a cassette, a magnetic disk storage, or another magnetic storage device or any other non-transmission medium. The computer storage medium can be configured to store information that can be accessed by a computing device. As described in the present specification, the computer readable medium does not include computer readable transitory media such as a modulated data signal and a carrier.

It is also worthwhile to note that the terms "include", "contain" or any other term variations are intended to cover a non-exclusive inclusion, such that a process, method, product, or device including a series of elements includes not only those elements but also other elements not explicitly listed, or elements that are inherent to such process, method, product, or device. In the absence of more restrictions, elements described by the phrase "include a/an . . . " do not exclude the existence of additional identical elements in the process, method, article, or device that includes the elements.

The present specification can be described in the general context of computer executable instructions, such as program modules, executed by a computer. Generally, the program modules include routines, programs, objects, components, data structures, etc. that perform particular tasks or implement particular abstract data types. The present specification can also be implemented in distributed computing environments where tasks are performed by remote processing devices that are connected through a communications network. In the distributed computing environments, the program modules can be located in both local and remote computer storage media including storage devices.

The various embodiments in the present specification are described progressively. The same or similar parts between the various embodiments can be referred to each other. The various embodiments place emphasis on differences from other embodiments. In particular, the system embodiments are simply described since they substantially correspond to the method embodiments, and reference will now be made in part to the description of the method embodiments.

The previous descriptions are merely embodiments of the present specification, and are not intended to limit the present application. Various changes and variations of the present application can occur to a person skilled in the art. Any modifications, equivalent substitutions, improvements, etc. that come within the spirit and principles of the present application are intended to be included within the scope of the claims of the present application.

What is claimed is:

1. A computer-implemented method, comprising:
receiving a data use request;
determining data to be used based on the data use request;
sending a process registration instruction to a blockchain node to instruct the blockchain node to generate a process identifier corresponding to the data use request;
receiving the process identifier from the blockchain node;
determining one or more approvers of the data to be used, wherein the one or more approvers include a data owner of the data to be used;
sending an approval instruction to one or more primary approvers of the one or more approvers, wherein the approval instruction instructs the one or more approvers to approve the data use request and the process identifier;
receiving first feedback data from the one or more primary approvers indicating approval of the data use request;
sending the approval instruction to one or more secondary approvers of the one or more approvers;
receiving secondary feedback data from the one or more secondary approvers, wherein the one or more primary approvers and the one or more secondary approvers having different approval authorities;
determining that the data use request is approved if a ratio of a quantity of the one or more primary approvers to a quantity of the one or more approvers satisfies a predetermined ratio condition; and
sending the process identifier to the blockchain node to be recorded on a blockchain based on performing a consensus algorithm.

2. The computer-implemented method of claim 1, comprising:
receiving data to be registered;
determining identification data corresponding to the data to be registered; and
registering the data to be registered based on the identification data.

3. The computer-implemented method of claim 1, comprising:
obtaining data to be registered;
determining identification data corresponding to the data to be registered; and
sending the data to be registered and the identification data to the blockchain node to perform a consensus of the data to be registered and the identification data to record the data and the identification data on the blockchain.

4. The computer-implemented method of claim 1, comprising:
obtaining data to be registered;
generating identification data corresponding to the data to be registered;
performing a consensus on the data to be registered and the identification data corresponding to the data to be registered; and
registering the data as registered data based on the identification data after the consensus is reached.

5. The computer-implemented method of claim 4, comprising:
registering the data to be registered based on a predetermined template that comprises at least one of approver information or approval authority information.

6. The computer-implemented method of claim 1, comprising:
   receiving a registration request;
   identifying a requester of the registration request;
   generating identity data corresponding to the registration requester; and
   registering the requester as a registered party based on the identity data.

7. The computer-implemented method of claim 6, wherein the requester comprises at least one of an owner of the data to be used, a recorder of the data to be used, or an approver of the data to be used.

8. The computer-implemented method of claim 3,
   wherein the consensus algorithm is performed on the process identifier, the first feedback data, the secondary feedback data, the identification data, and the data to be registered.

9. The computer-implemented method of claim 1, comprising:
   after receiving the data use request:
      determining that a sender of the data use request is a registered party;
      determining the data to be used based on the data use request;
      determining that the data to be used is registered data; and
      determining the one or more approvers corresponding to the data to be used.

10. A non-transitory, computer-readable medium storing one or more instructions executable by a computer system to perform operations comprising:
    receiving a data use request;
    determining data to be used based on the data use request;
    sending a process registration instruction to a blockchain node to instruct the blockchain node to generate a process identifier corresponding to the data use request;
    receiving the process identifier from the blockchain node;
    determining one or more approvers of the data to be used, wherein the one or more approvers include a data owner of the data to be used;
    sending an approval instruction to one or more primary approvers of the one or more approvers, wherein the approval instruction instructs the one or more approvers to approve the data use request and the process identifier;
    receiving first feedback data from the one or more primary approvers indicating approval of the data use request;
    sending the approval instruction to one or more secondary approvers of the one or more approvers;
    receiving secondary feedback data from the one or more secondary approvers, wherein the one or more primary approvers and the one or more secondary approvers having different approval authorities;
    determining that the data use request is approved if a ratio of a quantity of the one or more primary approvers to a quantity of the one or more approvers satisfies a predetermined ratio condition; and
    sending the process identifier to the blockchain node to be recorded on a blockchain based on performing a consensus algorithm.

11. The non-transitory, computer-readable medium of claim 10, the operations comprising:
    receiving data to be registered;
    determining identification data corresponding to the data to be registered; and
    registering the data to be registered based on the identification data.

12. The non-transitory, computer-readable medium of claim 10, the operations comprising:
    obtaining data to be registered;
    determining identification data corresponding to the data to be registered; and
    sending the data to be registered and the identification data to the blockchain node to perform a consensus of the data to be registered and the identification data to record the data and the identification data on the blockchain.

13. The non-transitory, computer-readable medium of claim 10, the operations comprising:
    obtaining data to be registered;
    generating identification data corresponding to the data to be registered;
    performing a consensus on the data to be registered and the identification data corresponding to the data to be registered; and
    registering the data as registered data based on the identification data after the consensus is reached.

14. The non-transitory, computer-readable medium of claim 13, the operations comprising:
    registering the data to be registered based on a predetermined template that comprises at least one of approver information or approval authority information.

15. The non-transitory, computer-readable medium of claim 10, the operations comprising:
    receiving a registration request;
    identifying a requester of the registration request;
    generating identity data corresponding to the registration requester; and
    registering the requester as a registered party based on the identity data.

16. The non-transitory, computer-readable medium of claim 15, wherein the requester comprises at least one of an owner of the data to be used, a recorder of the data to be used, or an approver of the data to be used.

17. The non-transitory, computer-readable medium of claim 12,
    wherein the consensus algorithm is performed on the process identifier, the first feedback data, the secondary feedback data, the identification data, and the data to be registered.

18. The non-transitory, computer-readable medium of claim 10, the operations comprising:
    after receiving the data use request:
       determining that a sender of the data use request is a registered party;
       determining the data to be used based on the data use request;
       determining that the data to be used is registered data; and
       determining the one or more approvers corresponding to the data to be used.

19. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
       receiving a data use request;
       determining data to be used based on the data use request;

sending a process registration instruction to a blockchain node to instruct the blockchain node to generate a process identifier corresponding to the data use request;

receiving the process identifier from the blockchain node;

determining one or more approvers of the data to be used, wherein the one or more approvers include a data owner of the data to be used;

sending an approval instruction to one or more primary approvers of the one or more approvers, wherein the approval instruction instructs the one or more approvers to approve the data use request and the process identifier;

receiving first feedback data from the one or more primary approvers indicating approval of the data use request;

sending the approval instruction to one or more secondary approvers of the one or more approvers;

receiving secondary feedback data from the one or more secondary approvers, wherein the one or more primary approvers and the one or more secondary approvers having different approval authorities;

determining that the data use request is approved if a ratio of a quantity of the one or more primary approvers to a quantity of the one or more approvers satisfies a predetermined ratio condition; and sending the process identifier to the blockchain node to be recorded on a blockchain based on performing a consensus algorithm.

\* \* \* \* \*